(12) United States Patent
Kortmeyer et al.

(10) Patent No.: US 12,241,004 B2
(45) Date of Patent: Mar. 4, 2025

(54) MEMBRANES COMPRISING A THERMALLY CURED ADHESIVE

(71) Applicant: JOHNS MANVILLE, Denver, CO (US)

(72) Inventors: Jordan Kortmeyer, Parker, CO (US); Diego Pedrazzoli, Littleton, CO (US)

(73) Assignee: Johns Manville, Denver, CO (US)

( * ) Notice: Subject to any disclaimer, the term of this patent is extended or adjusted under 35 U.S.C. 154(b) by 199 days.

(21) Appl. No.: 17/984,383

(22) Filed: Nov. 10, 2022

(65) Prior Publication Data
US 2024/0174895 A1    May 30, 2024

(51) Int. Cl.
*C09J 7/24* (2018.01)
*C09J 7/35* (2018.01)
*C09J 7/40* (2018.01)
*C09J 133/06* (2006.01)

(52) U.S. Cl.
CPC ............... *C09J 7/245* (2018.01); *C09J 7/243* (2018.01); *C09J 7/35* (2018.01); *C09J 7/40* (2018.01); *C09J 133/06* (2013.01); *C09J 2301/304* (2020.08)

(58) Field of Classification Search
CPC ..... C09J 7/245; C09J 7/243; C09J 7/35; C09J 7/40; C09J 133/06; C09J 2301/304; C09J 2203/346; C09J 2301/122; C09J 2423/006; C09J 2423/166; C09J 2427/006; C09J 7/385; E04D 5/148
See application file for complete search history.

(56) References Cited

U.S. PATENT DOCUMENTS 10,132,082 B2 * 11/2018 Tang ..................... C09J 7/243

* cited by examiner

*Primary Examiner* — Daniel H Lee
(74) *Attorney, Agent, or Firm* — Robert D. Touslee (57) ABSTRACT

Disclosed is an adhesive composition comprising an acrylic resin and an oligomeric resin having a reactive group and methods for making and using the adhesive composition in roofing membranes. The adhesive composition is thermally cured to form an adhesive layer. The adhesive composition may be applied to a membrane, such as a single-ply membrane, and then thermally cured. The single-ply membrane may then be adhered, via the adhesive layer, to a substrate, such as a roofing substrate.

17 Claims, 5 Drawing Sheets

MEMBRANES COMPRISING A THERMALLY CURED ADHESIVE

FIELD OF THE INVENTION

The invention relates to roofing membranes comprising a thermally cured adhesive composition, to processes for making the same, and to uses of the same. The adhesive composition comprises an acrylic resin and an oligomeric resin having a reactive group.

BACKGROUND OF THE INVENTION

Roofing membranes are commonly used for roofing systems of building and structures. Roofing membranes are often applied to the building or structure's roof to prevent leaks and/or to provide aesthetic appeal. Roofing membranes are commonly made of various synthetic rubber materials, modified bitumen, or thermoplastic materials. Low slope or flat roofs are typically covered with waterproofing materials. In a "built up roof," multiple components such as liquid asphalt and ballast are separately applied to the roof, often over an insulation layer. An alternative to the built up roof is to use a "single ply" membrane. A single ply membrane may be a large, flat, flexible membrane supplied on a roll, and rolled out on top of the roof, typically on top of the insulation layer. The term "single ply" is used to describe a roof having a single application of a membrane, but the membrane itself may comprise multiple layers such as polymer layers, reinforcing layers, adhesive layers, coatings, and the like. Typical base materials used for single ply membranes are thermoplastic polyolefin (TPO), ethylene propylene diene monomer (EPDM), polyvinyl chloride (PVC), and modified bitumen.

A single ply membrane may be supplied in any workable size, for example in rolls up to 50 feet wide or more containing 100 linear feet or more of membrane. When a roof is too large to be covered by a single piece of membrane, multiple pieces may be overlapped and joined at the seams using a waterproof joining method such as heat welding or adhesive bonding. More detail about the use of single ply membranes may be found in U.S. Patent Application Publication No. 2016/0362894, published Dec. 15, 2016 and titled "Sheet Roofing with Pre-Taped Seams and Tape Therefor," the entire disclosure of which is hereby incorporated by reference herein for all purposes.

Adhesive compositions for adhering such membranes to roofing substrates are typically UV-curable adhesives. While UV-curable adhesive compositions are technically "cured," the curing does not typically cure the entire adhesive but instead cures only a top layer or layers. In other words, the portion of the adhesive that is attached to the membrane is not cured. This lack of full curing may result in cohesive failure over time. UV-curing also typically includes a cross-linker.

WO 2017/165868 claims a roof system comprising: i. a roof substrate; ii. a first membrane including first and second opposed planar surfaces, where the first planar surface includes a roof-substrate contacting portion and a lap portion, said membrane having disposed on said roof-substrate contacting portion and said lap portion a UV-cured adhesive, where said first membrane is adhered to said roof substrate through said adhesive disposed on said roof-substrate contacting portion; and iii. a second membrane including opposed first and second planar surfaces, where the first planar surface includes a roof-substrate contacting portion and a lap portion, said membrane having disposed on said roof-substrate contacting portion and said lap portion a UV-cured adhesive, where said second membrane is adhered to said roof substrate through said adhesive disposed on said roof-substrate contacting portion, and where said second membrane is adhered to said first membrane through said adhesive disposed on said lap portion of said second membrane.

U.S. Pat. No. 10,132,082 claims a process for forming a roofing membrane composite, the process comprising: (a) heating a melt-extrudable, UV-curable pressure-sensitive adhesive to allow the adhesive to flow, where the adhesive consists of a polyacrylate elastomer and, optionally, one or more of photoinitiators, solvents, plasticizers, and resins selected from the group consisting of natural resins and hydrocarbon resins; (b) applying the adhesive to a planar surface of a thermoplastic or cured rubber roofing membrane panel for providing a weatherproof polymeric barrier to a building structure, to thereby form a coating layer of adhesive having a thickness of at least 152 μm, where the roofing membrane panel has a thickness of from about 500 μm to about 3 mm; (c) subjecting the coating layer of the adhesive to UV radiation to thereby effect crosslinking of the adhesive to form a cross-linked infinite polymer network; (d) applying a release member to the adhesive coating layer to form a roofing member composite; and (e) winding the composite.

Thus, the need exists for adhesive compositions that do not require UV curing and that have acceptable cohesive strength. These and other features are disclosed in the present specification.

BRIEF SUMMARY OF THE INVENTION

In some embodiments, the present disclosure includes a method of applying an adhesive layer to a membrane, the method comprising: a) providing a membrane; b) applying an adhesive composition to a surface of the membrane, wherein the adhesive composition comprises an acrylic resin and an oligomeric resin having a reactive group; and c) thermally curing the adhesive composition to form an adhesive layer on the membrane. The reactive group may be an epoxy group, an acid group, a urethane group, or combinations thereof. The method may further comprise applying a release liner to a surface of the adhesive layer opposite the surface of the membrane. The membrane may be a single-ply membrane and may comprise thermoplastic polyolefin (TPO), ethylene propylene diene terpolymer (EPDM), polyvinyl chloride (PVC), or combinations thereof. The adhesive composition may be applied to have a thickness on the substrate from 5 to 15 mils. The membrane itself (excluding the adhesive composition) may have a thickness from 45 to 90 mils. The thermal curing step may comprise reacting from 85 to 100% of the acrylic resin with the oligomeric resin having a reactive group. The adhesive layer may have SAFT value from 80 to 110° C. The adhesive layer may have a glass transition temperature from −40 to −30° C. The thermally curing may comprise applying heat at a temperature from 50 to 125° C. The thermally curing may comprise applying heat with a heated die, a radiant heat oven, an infrared heater, radiant heat rollers, or combinations thereof. The method may further comprise d) heat welding a seam of the membrane.

In some embodiments, the present disclosure includes a method of adhering a membrane to a roofing substrate, the method comprising: a) providing a membrane; b) applying an adhesive composition to a surface of the membrane, wherein the adhesive composition comprises an acrylic resin and an oligomeric resin having a reactive group; c) thermally curing the adhesive composition to form an adhesive layer on the membrane; and d) contacting the adhesive layer with a roofing substrate to adhere the membrane to the roofing substrate. The acrylic resin may be a hot-melt acrylic resin. The reactive group may be an epoxy group, an acid group, a urethane group, or combinations thereof. The substrate may comprise paper faced insulation board, isocyanate insulation board, gypsum board, plywood, oriented strand board (OSB), cement board, or combinations thereof.

In some embodiments, the present disclosure is directed to a membrane comprising an adhesive layer, wherein the adhesive layer is prepared by thermally curing an adhesive composition comprising an acrylic resin and an oligomeric resin comprising a reactive group.

In some embodiments, the present disclosure is directed to a three-layer material, the material comprising: a membrane, an adhesive layer, and a roofing substrate, wherein the adhesive layer is prepared by thermally curing an adhesive composition comprising an acrylic resin and an oligomeric resin comprising a reactive group.

In some embodiments, the present disclosure is directed to an adhesive layer comprising an acrylic-based polymer crosslinked by thermal heating with an oligomer having a reactive group, wherein the adhesive layer has a SAFT value from 80 to 110° C., and a Tg from −40 to −30° C.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings.

DETAILED DESCRIPTION OF THE INVENTION

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

Introduction

Methods for applying an adhesive layer to a membrane are disclosed herein. An adhesive composition is applied to a surface of the membrane and the adhesive composition is then thermally cured to form an adhesive layer on the membrane. The adhesive composition comprises an acrylic resin and an oligomeric resin having a reactive group. The adhesive composition is a curable adhesive, e.g., a curable hot-melt adhesive. When the adhesive composition is cured by heat, i.e., thermally cured, it has surprisingly and unexpectedly been found that the performance is greatly improved, as compared to UV cured adhesives. Without being bound by theory, it is believed that this improved performance is due to a full cure of the adhesive composition to the membrane. This and other advantages are described herein.

Acrylic Resin

As indicated above, the adhesive employed in the present invention is a curable hot-melt adhesive, which may also be referred to as a radiation-curable adhesive, a curable pressure-sensitive adhesive, or a pressure-sensitive adhesive. In one or more embodiments, the curable hot-melt adhesive may be an acrylic-based hot-melt adhesive. In one or more embodiments, the adhesive is a polyacrylate, such as a polyacrylate elastomer. In one or more embodiments, useful polyacrylates include one or more units defined by the formula:

where each $R^1$ is individually hydrogen or a hydrocarbyl group and each $R^2$ is individually a hydrocarbyl group. In the case of a homopolymer, each $R^1$ and $R^2$, respectively, throughout the polymer are same in each unit. In the case of a copolymer, at least two different $R^1$ and/or two different $R^2$ are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each $R^2$ is an alkyl group having at least 4 carbon atoms. In particular embodiments, $R^1$ is hydrogen and $R^2$ is selected from the group consisting of butyl, 2-ethylhexyl, and mixtures thereof.

Specific examples of polyacrylate elastomers that are useful as adhesives in the practice of the present invention include poly(butylacrylate), and poly(2-ethylhexylacrylate). These polyacrylate elastomers may be formulated with photoinitiators, solvents, plasticizers, and resins such as natural and hydrocarbon resins, for example. The skilled person can readily formulate a desirable adhesive composition. Useful adhesive compositions are disclosed, for example, in U.S. Pat. Nos. 6,720,399, 6,753,079, 6,831,114, 6,881,442, and 6,887,917, which are incorporated herein by reference.

Useful adhesive compositions may be commercially available in the art, depending on the desired specific components. For example, useful adhesives include those available under the tradename acResin (BASF), those available under the tradename AroCure (Ashland Chemical), and NovaMeltRC (NovaMelt). Such compositions, however, are described as being "UV curable" and are not taught to be heat curable or otherwise curable in the absence of UV curing.

In one or more embodiments, the polyacrylate elastomers that are useful as a component of the adhesive in the practice of this disclosure may have a glass transition temperature (Tg) of less than 0° C., e.g., less than –5° C., less than –10° C., less than –15° C., less than –20° C., less than –25° C., or less than –30° C. In these or other embodiments, useful polyacrylates may be characterized by a Tg of from about –70 to 0° C., from –65 to –20° C., or from –40 to about –30° C. In some aspects, the polyacrylate resin is AC 250, sold by BASF. This resin has a viscosity from approximately 40-60 Pa·s and a Tg of approximately –39° C.

In one or more embodiments, the polyacrylate elastomers that are useful as a component of the adhesive in the practice of this invention may be characterized by a weight average molecular weight of from about 100 to about 350 kg/mole, in other embodiments from about 150 to about 270 kg/mole, and in other embodiments from about 180 to about 250 kg/mole.

In one or more embodiments, the polyacrylate elastomers that are useful as a component of the adhesive the practice of this invention may be characterized by a Brookfield viscosity at 150° C. of from 20,000 to 70,000 cps, e.g., 30,000 to 60,000 cps, or from 40,000 to about 50,000 cps. In some aspects, the acrylic resin is a butyl acrylate resin, e.g., polybutyl acrylate.

In some aspects, the acrylic resin may also comprise a UV-curable oligomer. In accordance with the method described herein, however, since UV light is not applied to cure the resin, UV curing will not occur by itself. Accordingly, the acrylic resin is not purposefully UV cured to the membrane. Any UV curing that does occur is incidental, i.e., unintentional. In some aspects, the acrylic resin is not subjected to any UV curing.

Oliciomeric Resin Having a Reactive Group

The adhesive composition described herein also comprises an oligomeric resin having a reactive group. The oligomeric resin having a reactive group is not particularly limited so long as it has a group that reacts with the acrylic resin when exposed to heat, e.g., thermal curing. Some exemplary reactive groups include epoxy group, an acid group, a urethane group, or combinations thereof. In some aspects, the oligomeric resin having a reactive group is an oligomeric resin having an epoxide group. An exemplary oligomeric resin is Joncryl ADR 4385, a liquid acrylic resin that contains epoxy groups. Without being bound by theory, it is believed that it is these reactive groups, e.g., epoxy groups, that allow for thermal curing of the adhesive composition rather than the application of UV light.

Adhesive Composition and Application Thereof

The adhesive composition comprises the acrylic resin and oligomeric resin having a reactive group, as described herein. Without being bound by theory, it is believed that when thermally cured, the acrylate resin reacts with the thermally reactive oligomer and the acrylate groups branch to form a network. This network increases the strength of the adhesive layer.

The adhesive composition may also include additional components, such as colorants and tackifiers. In some aspects, when a tackifier is included, the tackifier may be present in an amount from 0 to 7 wt. %, e.g., from 0.1 to 7 wt. %, from 0.25 to 6.5 wt. %, from 0.5 to 6 wt. %, from 0.75 to 5.5 wt. %, or from 1 to 5 wt. %. Without being bound by theory, the tackifier may be included to improve the initial adhesion of the adhesive composition, i.e., prior to heat curing. In some aspects, when a colorant is included, the colorant may be present in an amount from 0 to 1.5 wt. %, based on the total weight of the adhesive composition, e.g., from 0.1 to 1.5 wt. %, from 0.5 to 1.5 wt. %, from 0.75 to 1.5 wt. %, or from 1.0 to 1.5 wt. %. Without being bound by theory, the colorant may be included to aid in UV absorption. In some aspects, both a tackifier and a colorant are included.

The adhesive composition may be applied to a membrane by a variety of methods, including use a slit die, a transfer coater, or a release liner.

Suitable materials for forming a release liner that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. The liner, which may be referred to as a release liner, can be applied to an exposed surface adhesive layer.

The membrane may be a single-ply membrane. In some aspects, the membrane comprises thermoplastic polyolefin (TPO), ethylene propylene diene terpolymer (EPDM), polyvinyl chloride (PVC), or combinations thereof. The adhesive composition may be applied in a thickness from 5 to 15 mils, from 6 to 14 mils, from 6 to 13 mils, or from 7 to 11 mils. The thickness of the adhesive composition may be selected depending on the desired end use, e.g., the type of roofing substrate to which the membrane will be adhered.

Thermal Curing

Following application of the adhesive composition to the membrane, the adhesive composition is thermally cured. The heat for thermal curing may be applied by a convection heater, a heated die, a radiant heat oven, an infrared heater, radiant heat rollers, or combinations thereof. The heat may be applied at a temperature from 50 to 125° C., e.g., from 60 to 120° C., from 70 to 120° C., from 75 to 125° C., from 75 to 110° C., or any combination of ranges and endpoint thereof.

The thermal curing may be conducted so that from 85 to 100% of the acrylic resin is reacted with the oligomeric resin, e.g., from 87.5 to 100%, from 90 to 100%, from 92.5 to 100%, from 95 to 100%, from 97.5 to 100%, or from 99 to 100%. In some aspects, essentially 100% of the acrylic resin is reacted with the oligomeric resin. It is not desirable to go above 100%, referred to as "over curing" due to a sharp decrease in adhesion, i.e., from 60 to 70% decrease. This thermal curing step may be completed in a single step, or in multiple steps. In some aspects, the % of the reaction is based on the SAFT test using a one (1) kilogram weight.

Exemplary reactions between an acrylic resin and a thermally reactive epoxied group oligomer are shown below, wherein each R may independently be a hydrogen, substituted or unsubstituted C1-20 alkyl group, or other group as contemplated herein.

Without being bound by theory, it is believed that by thermally curing the adhesive composition, rather than using ultraviolet curing, the acrylic resin is more completely reacted because the heat penetrates the adhesive composition more than ultraviolet energy could. Accordingly, the adhesive composition is more strongly adhered to the membrane and experiences less cohesive failure over time, i.e., stays attached to both the membrane and to the roofing substrate.

The molecular weight of the polymer may vary depending on the specific polymer. For polyacrylic acid polymers, the weight average molecular weight (Mw) optionally ranges from 2000 to 7000 amu, e.g., from 3000 to 5000 amu, or from 3500 to 4500 amu.

Adhesive Layer

The polymer compound may be a solution polymer that helps make a rigid thermoplastic binder when cured. In contrast, when the polymer compound is an emulsion polymer, the final binder compositions are usually less rigid (i.e., more flexible) at room temperature. The cured adhesive layer is formed on the membrane following heat curing. The adhesive layer may have a thickness from 5 to 15 mils, from 6 to 14 mils, from 6 to 13 mils, or from 7 to 11 mils. The thickness of the adhesive layer, like the adhesive composition, may be selected depending on the desired end use, e.g., the type of roofing substrate to which the adhesive layer is adhered. In some aspects, the adhesive layer has a thickness from 5 to 50% relative to the thickness of the membrane, e.g., from 10 to 45%, from 15 to 40%, or from 20 to 35%.

The adhesive layer may have a shear adhesion failure temperature (SAFT) value from 80 to 110° C., e.g., from 85 to 110° C., from 90 to 105° C., or from 95 to 100° C. The adhesive layer may not flow or have movement at temperatures from 80 to 11-° C. and may be tacky at 15° C.

The adhesive layer may have a glass transition temperature from −40 to −30° C., e.g., from −39 to −31° C., from −38 to −32° C., from −37 to −33° C., or from −36 to −34° C.

Membrane

The membrane to which the adhesive composition is applied may be a single ply membrane. In some aspects, the membrane may be a multi ply membrane, e.g., a membrane have more than a single ply. In some aspects, the membrane thermoplastic polyolefin (TPO), ethylene propylene diene terpolymer (EPDM), polyvinyl chloride (PVC), or combinations thereof.

In some aspects, following the formation of the adhesive layer on the membrane, the method may further comprise heat welding a seam of the membrane.

Roofing Substrate

In some aspects, the membrane is secured to a roofing substrate by the adhesive layer. The adhesive layer is exposed, e.g., by removing a release liner, and then pressed onto the roofing substrate. In some aspects, a roofing primer may be used. In these aspects, the primer is applied to the roofing substrate and allowed to dry until tacky to the touch. Then the adhesive layer is pressed onto the primer, securing the membrane to the roofing substrate.

The roofing substrate may comprise paper faced insulation board, isocyanate insulation board, gypsum board, plywood, oriented strand board (OSB), cement board, or combinations thereof.

Once assembled, the membrane, adhesive layer, and roofing substrate may be referred to as a three-layer material, though other combinations of the layers are also contemplated herein.

Once assembled, the maximum load strength between the roofing substrate and the adhesive layer may be from 2 to 20 force pounds, as measured using a tear drop test on an Instron Pull Tester, e.g., from 2.05 to 20 force pounds, from 2.5 to 20 force pounds, from 3 to 20 force pounds, from 3 to 17.5 force pounds, from 3.5 to 17.5 force pounds, from 4 to 15 force pounds, from 4.5 to 15 force pounds, from 5 to 15 force pounds, from 6 to 15 force pounds, from 7 to 15 force pounds, from 7.5 to 15 force pounds, from 4.2 to 14 force pounds, from 4.5 to 13 force pounds, from 5 to 10 force pounds, and all values in between.

EMBODIMENTS

Embodiment 1: A method of applying an adhesive layer to a membrane, the method comprising: a) providing a membrane; b) applying an adhesive composition to a surface of the membrane, wherein the adhesive composition comprises an acrylic resin and an oligomeric resin having a reactive group; and c) thermally curing the adhesive composition to form an adhesive layer on the membrane.

Embodiment 2: The method of Embodiment 1, wherein the reactive group is an epoxy group, an acid group, a urethane group, or combinations thereof.

Embodiment 3: The method of Embodiment 1 or 2, further comprising: d) applying a release liner to a surface of the adhesive layer opposite the surface of the membrane.

Embodiment 4: The method of any of the preceding Embodiments, wherein the membrane is a single ply membrane.

Embodiment 5: The method of any of the preceding Embodiments, wherein the membrane comprises thermoplastic polyolefin (TPO), ethylene propylene diene terpolymer (EPDM), polyvinyl chloride (PVC), or combinations thereof.

Embodiment 6: The method of any of the preceding Embodiments, wherein the adhesive composition has a thickness from 5 to 15 mils.

Embodiment 7: The method of any of the preceding Embodiments, wherein the membrane has a thickness from 45 to 90 mils.

Embodiment 8: The method of any of the preceding Embodiments, wherein the thermally curing comprises reacting Embodiment 85 to 100% of the acrylic resin with the oligomeric resin.

Embodiment 9: The method of any of the preceding Embodiments, wherein the adhesive layer has a SAFT value from 80 to 110° C. (ASTM D 4498).

Embodiment 10: The method of any of the preceding Embodiments, wherein the adhesive layer has a glass transition temperature from −40 to −30° C.

Embodiment 11: The method of any of the preceding Embodiments, wherein the thermally curing comprises applying heat at a temperature from 50 to 125° C.

Embodiment 12: The method of any of the preceding Embodiments, wherein the thermally curing comprises applying heat with a heated die, a radiant heat oven, an infrared heater, radiant heat rollers, or combinations thereof.

Embodiment 13: The method of any of the preceding Embodiments, wherein the method further comprises: d) heat welding a seam of the membrane.

Embodiment 14: A method of adhering a membrane to a roofing substrate, the method comprising: a) providing a membrane; b) applying an adhesive composition to a surface of the membrane, wherein the adhesive composition comprises an acrylic resin and an oligomeric resin having a reactive group; c) thermally curing the adhesive composition to form an adhesive layer on the membrane; and d) contacting the adhesive layer with a roofing substrate to adhere the membrane to the roofing substrate.

Embodiment 15: The method of Embodiment 14, wherein the acrylic resin is a hot-melt acrylic resin.

Embodiment 16: The method of Embodiment 14 or 15, wherein the reactive group is an epoxy group, an acid group, a urethane group, or combinations thereof.

Embodiment 17: The method of any of Embodiments 14-16, wherein the substrate comprises paper faced insulation board, isocyanate insulation board, gypsum board, plywood, oriented strand board (OSB), cement board, or combinations thereof.

Embodiment 18: A membrane comprising an adhesive layer prepared according to any of the preceding Embodiments.

Embodiment 19: A three-layer material, the material comprising: a membrane, an adhesive layer, and a roofing substrate, wherein the membrane and adhesive layer are prepared according to any of Embodiments 1-13.

Embodiment 20: An adhesive layer comprising an acrylic-based polymer crosslinked by thermal heating with an oligomer having a reactive group, wherein the adhesive layer has a (shear adhesion failure temperature test (SAFT) value from 80 to 110° C. and a Tg from −40 to −30° C.

EXPERIMENTAL

The following Examples are presented to provide specific representative embodiments of the present invention. The invention is not limited to the specific details as set forth in these Examples.

Example 1

Figure 1:
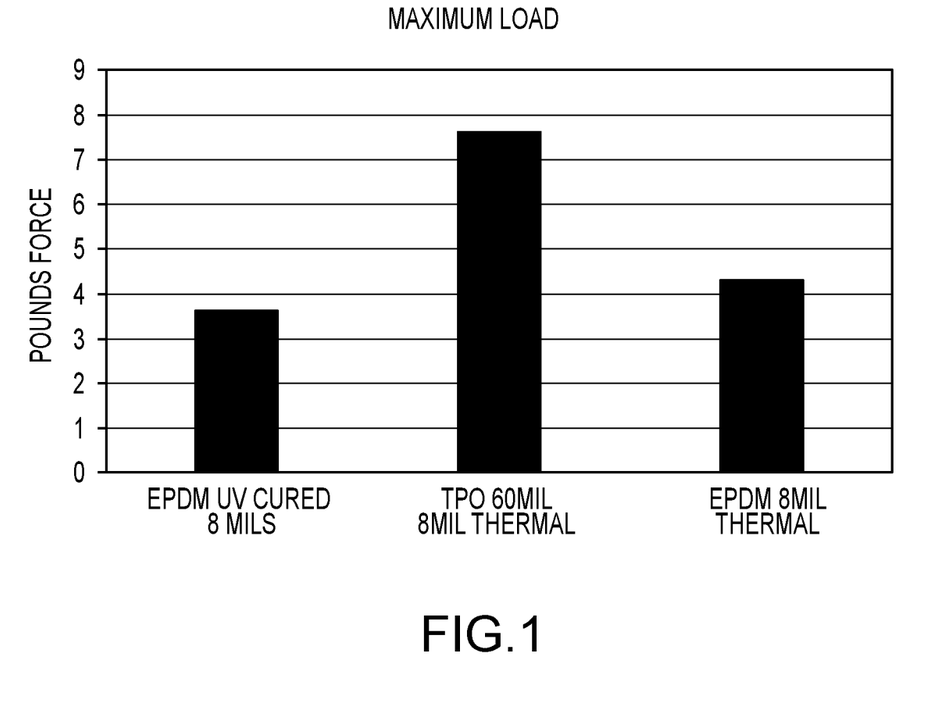
FIG. 1 is graph showing the results of tear drop testing in accordance with embodiments of the present invention.

Three single ply membranes (Comparative Sample A and Inventive Samples B and C) were secured to isocyanate insulation board with a hot melt adhesive layer. The hot melt adhesive layer was formed from a hot melt adhesive composition containing 97.5 wt. % polybutyl acrylate (AC Resin 250) and 2.5 wt. % liquid acrylic resin with epoxy functionality (Joncryl ADR 3585). The hot melt adhesive composition was applied in a thickness of 8 mils and heat cured. From 90 to 100% of the adhesive layer was cured, as measured by a modified ASTM D4498 (the test was conducted at 71.11° C. using a 3 inch by 8 inch (7.62 by 20.32 cm) stainless steel plate. The maximum load strength between the hot melt adhesive and the substrate was tested using a tear drop test. As shown in FIG. 1, for Comparative Sample A, an EPDM first single play membrane was secured to an isocyanate insulation board after an adhesive layer was UV-cured onto the EPDM membrane. The maximum load strength for Comparative Sample A was approximately 3.7 pounds force. For Sample C, which was prepared identically to Comparative Sample A except that it was heat cured rather than UV cured, the maximum load strength was approximately 4.4 pounds force. Thus, heat curing resulted in a 19% increase. For Sample B, where the membrane was TPO, the maximum load strength was approximately 7.7 pounds force, a 110% increase relative to Comparative Sample A due to heat curing rather than UV curing.

Example 2

Figure 2:
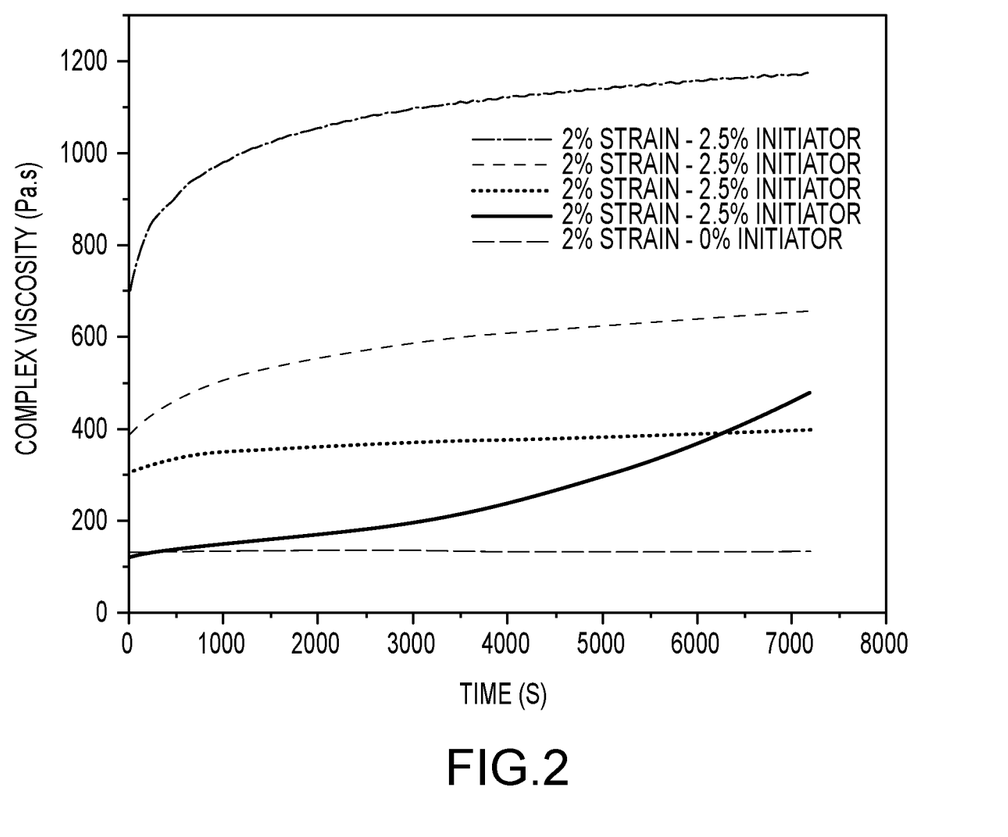
FIG. 2 is a graph showing complex viscosity in accordance with embodiments of the present invention.

Varying amounts of a liquid acrylic resin with epoxy functionality (Joncryl 4385 ADR) were mixed with polybutyl acrylate (AC 250 resin from BASF) and the complex viscosity was tested as a function of time as reported in FIG. 2. Each sample of AC 250 was weighed and heated to approximately 30° C. to soften the sample. The liquid acrylic resin (initiator) was then added and stirred with the AC 250. The stirred samples were then placed in a rheometer and held at 30° C. The adhesive composition was extruded onto a membrane. Next, the membrane comprising the extruded adhesive composition was sent through an infrared heater at a rate of 10 ft/min (3.048 m/min) and at a temperature of 165° C. to thermally cure the adhesive composition to form an adhesive layer on the membrane. Once the membrane comprising the adhesive layer was removed from the heater, a release liner was applied and the membrane was rolled up. Once it had cooled to room temperature, the membrane was unrolled. The release liner was removed and the membrane and adhesive layer were heated to a temperature of 100° C. The temperature of 100° C. was selected to mimic the temperature that the membrane may be exposed to on a hot roof.

Five samples were tested and the results are shown in FIG. 2. Sample E (top line) was tested with 2.5% liquid acrylic resin at 2% strain. Sample F (second line from the top) was tested with 2.5% liquid acrylic resin at 2% strain. Sample G (middle line) was tested with 2.5% liquid acrylic resin at 2% strain. Sample H (second line from the bottom) was tested with 2.5% liquid acrylic resin at 2% strain. Comparative Sample I (bottom line) was tested at 2% strain with 0% liquid acrylic resin. As expected, the Complex Viscosity of Comparative Sample I did not increase over time, indicating that no curing occurred. The bottom line indicates a 2% strain rheological test performed on a system heated to 100° C. and cured with 0% initiator. In this case, viscosity did not increase over time, due to the lack of initiator, leading to no crosslinking. On the other hand, in presence of 2.5% initiator, the complex viscosity does increase over time, as detected during a 2% strain rheological test performed at 35° C., 50° C., 75° C. and 100° C. (top line, second line from the top, middle line and second line from the bottom, respectively).

Example 3

Figure 3:
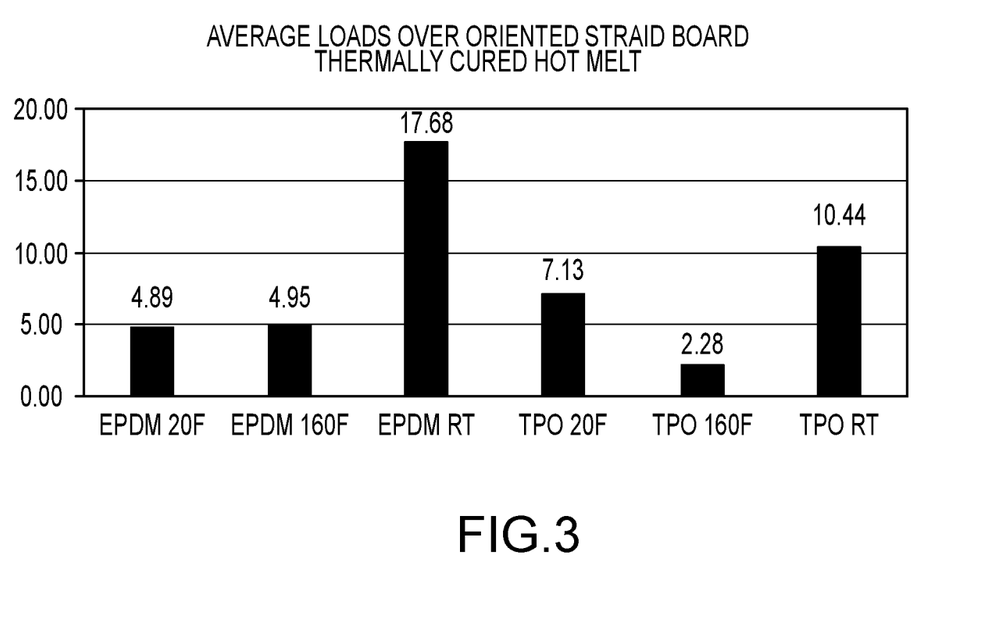
FIG. 3 is a graph showing average loads over oriented strand board in accordance with embodiments of the present invention.
Figure 4:
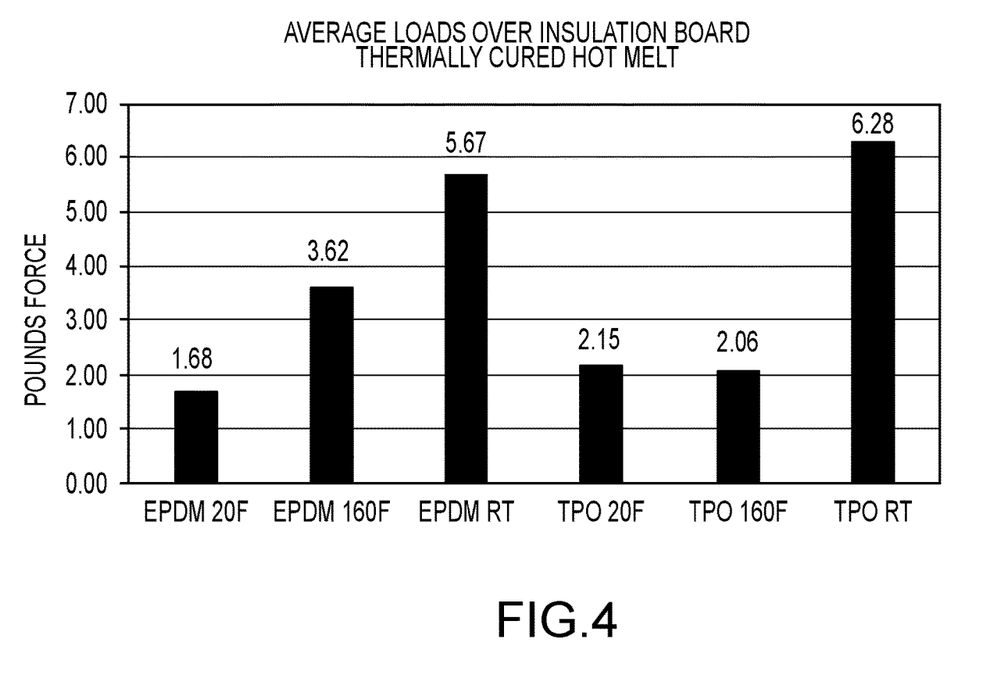
FIG. 4 is a graph showing average loads over insulation board in accordance with embodiments of the present invention.
Figure 5:
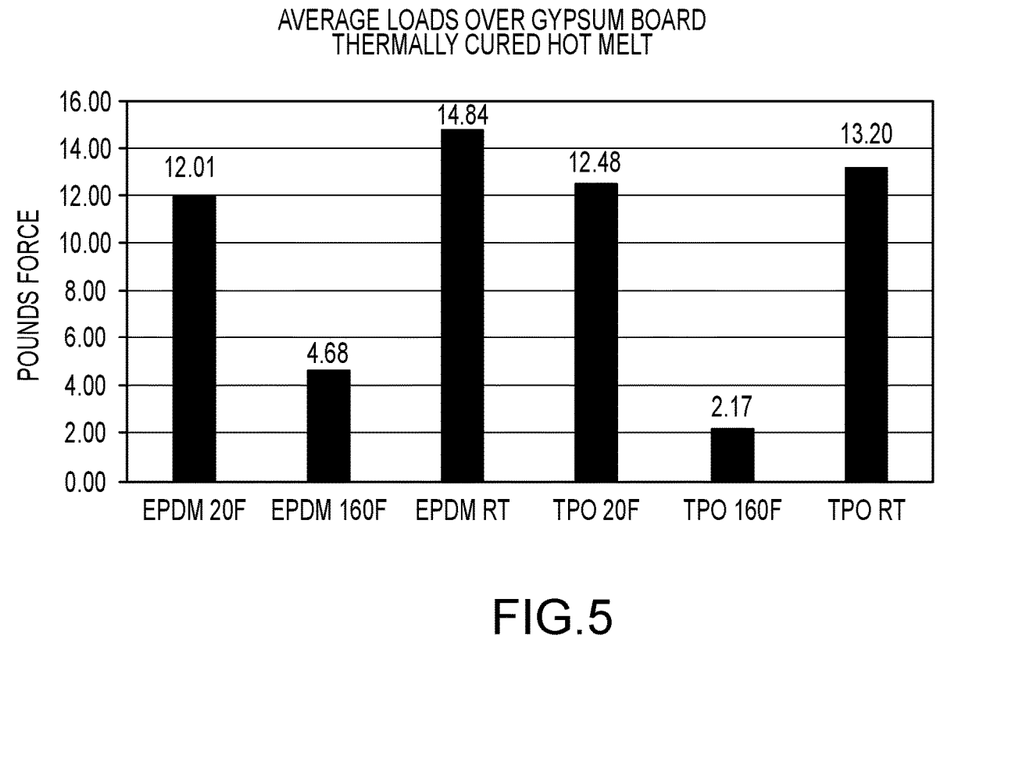
FIG. 5 is a graph showing average loads over gypsum board in accordance with embodiments of the present invention.

An adhesive composition comprising 1 wt. % liquid acrylic resin with epoxy functionality (Joncryl 4385 ADR) and 99 wt. % polybutyl acrylate (AC 250 resin from BASF) was prepared and applied to EPDM and TPO membranes as reported below. The adhesive composition was cured and each membrane was secured to a roofing substrate. Each roofing substrate secured to a membrane via the heat cured adhesive layer was then tested at either −6.67° C., room temperature (approximately 20° C.) or at 71.1° C., in order to mimic temperatures to which a roofing substrate would be exposed on a structure. The average load for each sample was tested as reported in FIGS. 3-5, according to an Instron Tester. The samples showing each combination of membrane, roofing substrate, and temperature are shown in Table 1.

TABLE 1

| Sample | Membrane | Roofing Substrate | Temperature (° C.) |
|--------|----------|-------------------|---------------------|
| J | EPDM | Straid Board | −6.67 |
| K | EPDM | Straid Board | 71.1 |
| L | EPDM | Straid Board | ~20 (room temperature) |
| M | TPO | Straid Board | −6.67 |
| N | TPO | Straid Board | 71.1 |
| O | TPO | Straid Board | ~20 (room temperature) |
| P | EPDM | Insulation Board | −6.67 |
| Q | EPDM | Insulation Board | 71.1 |
| R | EPDM | Insulation Board | ~20 (room temperature) |
| S | TPO | Insulation Board | −6.67 |
| T | TPO | Insulation Board | 71.1 |
| U | TPO | Insulation Board | ~20 (room temperature) |
| V | EPDM | Gypsum Board | −6.67 |
| W | EPDM | Gypsum Board | 71.1 |
| X | EPDM | Gypsum Board | ~20 (room temperature) |
| Y | TPO | Gypsum Board | −6.67 |
| Z | TPO | Gypsum Board | 71.1 |
| AA | TPO | Gypsum Board | ~20 (room temperature) |

The results indicate that heat curing has a superior average force pound value as compared to UV curing. UV curing typically results in an average from 0.5 to 2.0 force pounds while each reported result was above this value and in some cases, well above this value.

While the invention has been described in detail, modifications within the spirit and scope of the invention will be readily apparent to those of skill in the art. It should be understood that aspects of the invention and portions of various embodiments and various features recited herein and/or in the appended claims may be combined or interchanged either in whole or in part. In the foregoing descriptions of the various embodiments, those embodiments which refer to other embodiments may be appropriately combined with other embodiments as will be appreciated by one of ordinary skill in the art. Furthermore, those of ordinary skill in the art will appreciate that the foregoing description is by way of example only, and is not intended to limit the invention.

What is claimed is:

1. A method of applying an adhesive layer to a membrane, the method comprising:
    a) providing a membrane;
    b) applying an adhesive composition to a surface of the membrane, wherein the adhesive composition comprises an acrylic resin and an oligomeric resin having a reactive group; and
    c) thermally curing the adhesive composition to form an adhesive layer on the membrane.

2. The method of claim 1, wherein the reactive group is an epoxy group, an acid group, a urethane group, or combinations thereof.

3. The method of claim 1, further comprising:
    applying a release liner to a surface of the adhesive layer opposite the surface of the membrane.

4. The method of claim 1, wherein the membrane is a single ply membrane.

5. The method of claim 1, wherein the membrane comprises thermoplastic polyolefin (TPO), ethylene propylene diene terpolymer (EPDM), polyvinyl chloride (PVC), or combinations thereof.

6. The method of claim 1, wherein the adhesive composition has a thickness from 5 to 15 mils.

7. The method of claim 1, wherein the membrane has a thickness from 45 to 90 mils.

8. The method of claim 1, wherein the thermally curing comprises reacting from 85 to 100% of the acrylic resin with the oligomeric resin.

9. The method of claim 1, wherein the adhesive layer has a SAFT value from 80 to 110° C.

10. The method of claim 1, wherein the adhesive layer has a glass transition temperature from −40 to −30° C.

11. The method of claim 1, wherein the thermally curing comprises applying heat at a temperature from 50 to 125° C.

12. The method of claim 1, wherein the thermally curing comprises applying heat with a heated die, a radiant heat oven, an infrared heater, radiant heat rollers, or combinations thereof.

13. The method of claim 1, wherein the method further comprises:
    heat welding a seam of the membrane.

14. A method of adhering a membrane to a roofing substrate, the method comprising:
    a) providing a membrane;
    b) applying an adhesive composition to a surface of the membrane, wherein the adhesive composition comprises an acrylic resin and an oligomeric resin having a reactive group;
    c) thermally curing the adhesive composition to form an adhesive layer on the membrane; and
    d) contacting the adhesive layer with a roofing substrate to adhere the membrane to the roofing substrate.

15. The method of claim 14, wherein the acrylic resin is a hot-melt acrylic resin.

16. The method of claim 14, wherein the reactive group is an epoxy group, an acid group, a urethane group, or combinations thereof.

17. The method of claim 14, wherein the substrate comprises paper faced insulation board, isocyanate insulation board, gypsum board, plywood, oriented strand board (OSB), cement board, or combinations thereof.

* * * * *